A. N. SAMMARONE.
CABLE COUPLING.
APPLICATION FILED NOV. 9, 1918.

1,312,455.

Patented Aug. 5, 1919.

Inventor
Amato N. Sammarone
By John A. Bornhardt
Attorney

UNITED STATES PATENT OFFICE.

AMATO N. SAMMARONE, OF CLEVELAND, OHIO.

CABLE-COUPLING.

1,312,455.  Specification of Letters Patent.  Patented Aug. 5, 1919.

Application filed November 9, 1918. Serial No. 261,773.

*To all whom it may concern:*

Be it known that I, AMATO N. SAMMARONE, a citizen of the United States, residing at Cleveland, in the county of Cuyahoga and State of Ohio, have invented certain new and useful Improvements in Cable - Couplings, of which the following is a specification.

This invention relates to a cable coupling or connection, particularly useful for connecting the wire rope or cable to a link or other device, the object of the invention being to provide improved means for clamping or fastening the end of the cable and for permitting a convenient attachment of the link or other device.

In the accompanying drawing—

Figure 1:
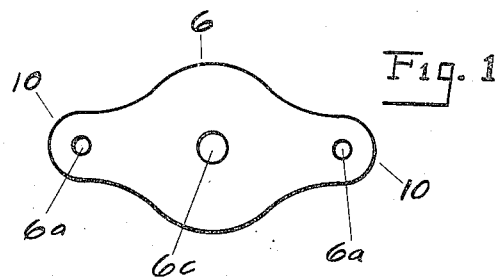
Figure 1 is a plan of one member of the coupling, before it is bent to shape.
Figure 2:
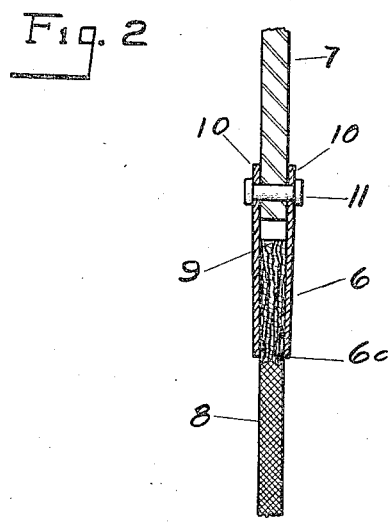
Figs. 2 and 3 are sectional views illustrating the completed article.

In the drawings, 8 indicates a wire cable or the like and 7 a link to which it is connected. The connection is effected by means of a plate 6 having two ears 10 at opposite sides, with a hole 6ª in each ear and a hole 6ᶜ at the center.

Figure 3:
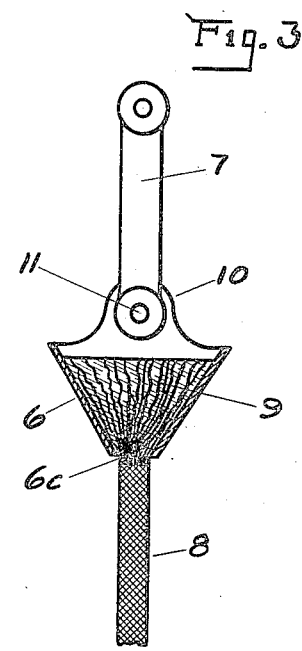
Figure 4:
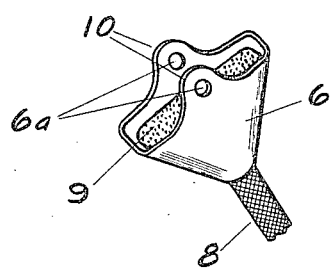
Fig. 4 is a perspective view of one member of the coupling, after being bent to shape.

In assembling the parts the end of the cable 8 is inserted through the hole 6ᶜ, and the plate 6 is then folded to bring the ears 10 opposite each other, and also compressed or swaged laterally to produce a V-shaped pocket, as shown in Figs. 3 and 4, the end of the cable being spread in this pocket and secured therein by melted lead poured into the same, as indicated at 9. The link 7 is attached between the ears 10 by a rivet 11 passing through holes 6ª and through a hole in the end of the link. The joint can be flexible or tight as desired.

The device will be found particularly useful in connecting struts or guys in airplane making, but is capable of various uses where a strong connection to a wire rope or the like is needed.

I claim:

A coupling comprising a shaped sheet metal member having opposite parallel sides and inclined ends, forming a V - shaped pocket, with a hole at the apex, the sides having perforated ears.

In testimony whereof, I do affix my signature in presence of two witnesses.

AMATO N. SAMMARONE.

Witnesses:
 F. MELARAGUY,
 ANTIMO CELLI.

Copies of this patent may be obtained for five cents each, by addressing the "Commissioner of Patents, Washington, D. C."